(12) United States Patent
Narayanaswamy et al.

(10) Patent No.: US 6,261,613 B1
(45) Date of Patent: Jul. 17, 2001

(54) REFRIGERATED AND SHELF-STABLE BAKERY DOUGH PRODUCTS

(75) Inventors: Venkatachalam Narayanaswamy, Maple Grove; George V. Daravingas, Edina, both of MN (US)

(73) Assignee: General Mills, Inc., Minneapolis, MN (US)

( * ) Notice: Subject to any disclaimer, the term of this patent is extended or adjusted under 35 U.S.C. 154(b) by 0 days.

(21) Appl. No.: 09/504,523

(22) Filed: Feb. 15, 2000

(51) Int. Cl.$^7$ .................................................. A21D 10/00
(52) U.S. Cl. .................. 426/94; 426/98; 426/291; 426/293; 426/296; 426/128; 426/553; 426/555; 426/391
(58) Field of Search ................. 426/94, 98, 138, 426/291, 293, 296, 128, 552, 553, 555, 391

(56) References Cited

U.S. PATENT DOCUMENTS

| | | |
|---|---|---|
| 2,982,662 | 5/1961 | Cochran . |
| 3,649,304 | 3/1972 | Fehr, Jr. et al. . |
| 3,862,341 | 1/1975 | Johannes . |
| 4,022,917 * | 5/1977 | Selenke ................................ 426/331 |
| 4,353,932 | 10/1982 | Bone . |
| 4,774,099 | 9/1988 | Feeney et al. . |
| 4,792,456 * | 12/1988 | Katz et al. ............................ 426/551 |
| 4,904,493 | 2/1990 | Petrizzeli . |
| 4,940,595 | 7/1990 | Yasosky et al. . |
| 5,034,241 | 7/1991 | Keyser et al. . |
| 5,106,635 | 4/1992 | McCutchan et al. . |
| 5,178,893 | 1/1993 | Seewi et al. . |
| 5,209,879 * | 5/1993 | Redding, Jr. ........................... 264/23 |
| 5,384,139 | 1/1995 | Vasseneix . |
| 5,409,720 | 4/1995 | Kent et al. . |
| 5,447,739 | 9/1995 | Emanuelson et al. . |
| 5,460,756 * | 10/1995 | Redding, Jr. ............................ 264/4 |
| 5,514,387 | 5/1996 | Zimmerman et al. . |
| 5,589,194 * | 12/1996 | Tsuei et al. ........................... 424/497 |
| 6,013,294 | 1/2000 | Bunke et al. . |
| 6,024,997 | 2/2000 | Blaschke . |
| 6,030,654 | 2/2000 | Thomas et al. . |
| 6,039,994 | 3/2000 | LeFlecher et al. . |
| 6,149,953 * | 2/2000 | Redding, Jr. ........................... 426/98 |
| 6,149,960 * | 11/2000 | Book et al. .......................... 426/551 |

FOREIGN PATENT DOCUMENTS

| | | |
|---|---|---|
| 0 868 850 A1 | 10/1998 | (EP) . |
| 2108150 * | 5/1983 | (GB) . |
| WO 99/04640 * | 2/1999 | (WO) . |

* cited by examiner

*Primary Examiner*—Nina Bhat
(74) *Attorney, Agent, or Firm*—John A. O'Toole; Douglas J. Taylor; Janal Kalis

(57) ABSTRACT

The present invention includes a batter or dough that comprises a plurality of capsules and a cookable fluid in which the capsules are dispersed. Each of the capsules is comprised of a shell made of a lipid that melts at a predictable, narrow temperature range and a core comprised of a leavening agent. The leavening agent is either a chemical leavening agent or a yeast-based leavening agent or a combination of a chemical leavening agent and yeast-based leavening agent. The batter or dough is preserved in a flowable condition by using a combination of acidic pH, control of water activity, and refrigerated storage temperature against microbial spoilage further assured by using preservatives such as potassium sorbate or calcium propionate.

49 Claims, 1 Drawing Sheet

REFRIGERATED AND SHELF-STABLE BAKERY DOUGH PRODUCTS

FIELD OF THE INVENTION

The present invention relates to food products such as refrigerated or frozen batters for baked or griddle cakes and shelf-stable bakery, batter, dry mix and dough products that are stored in substantially unpressurized containers and to methods for their preparation.

BACKGROUND OF THE INVENTION

Consumer habits with respect to food preparation have changed dramatically and perhaps irrevocably over the past twenty years. The days of a homemaker routinely making products such as breads, cakes, cookies, muffins, or pancakes "from scratch" within the home are substantially gone. Changing lifestyles for both consumers and preparers of food have resulted in a situation where very little time is available for cooks within the home to regularly make baked goods from fundamental ingredients, such as flour, water, sugar, baking powder and baking soda.

Additionally, consumers have been regularly exposed to foods professionally prepared by others, having particular textures and flavors of consistent quality. This exposure has occurred as a result of eating out in restaurants and bringing food into the home that is fully prepared. This food is not limited to "fast food" but includes meals fully prepared by restaurants for "take out" or food prepared by caterers. Over time, consumers have acquired standards for textures of bread, cakes, cookies and pancakes, which are not easily reproducible time after time within the home. Home made food products which do not meet these particular standards are regarded as unsatisfactory. The cook in the home feels that he or she is inadequate because of an inability to reproduce a particular texture, mouth-feel, and flavor for a food product each and every time the food is prepared.

In response to these changes in consumer habits and expectations, manufacturers of products such as breads, cakes, cookies and pancakes have prepared for sale, intermediate forms of these products. The intermediate forms have included products such as doughs and batters. These intermediate forms of food products have been offered with a goal of satisfying a consumer's need for a freshly baked foodstuff such as muffins or cake while expending a minimum amount of time for food preparation with minimum risk of failure. It has also been hoped that by providing the batters or doughs, a consistent, predictable organoleptic quality can be achieved each time the batters or doughs are cooked or baked to make the edible foodstuff.

Manufacturers have encountered several significant problems in providing these intermediate products such as batters or doughs. One problem has been degradation of the intermediate product in storage due to undesirable chemical reactions. Doughs such as bread dough and batters such as cake batter are complicated chemical systems. In a case of yeast leavened bread dough, the dough is not only a complicated chemical system but is also a complicated biological system because of living yeast cells within the dough. Storage of yeast leavened dough or batter at refrigerated temperatures has resulted in premature leavening of the batter or dough which has produced an undesirable baked good.

One type of dough product is a chemically-leavened dough stored at refrigeration temperatures. Currently, refrigerated dough products are manufactured, and packaged in cardboard cans or tubes. The cans are filled with dough to about 80% capacity by volume, prior to proofing the dough. The cardboard cans comprise an annular sidewall and opposing metal ends. The metal ends of the cans are forced into the annular sidewall of each of the cans.

The cans with the product contained therein are then proofed at 32.2° C. for several hours to allow release of carbon dioxide generated by a leavening reaction. The dough may be chemically leavened or leavened by temperature sensitive yeast cells. The atmosphere created by leavening is anaerobic within the can and allows for expansion of the dough so that the dough pushes against the metal ends. A continuous release of carbon dioxide through tiny fissures or vents within the can generates internal can pressures of up to 0.7 to 1.7 atm which the can must sustain throughout storage. The can in which dough is stored must be strong enough to prevent dough generated pressure from breaking open the can.

The internal pressure generated within the can by dough leavening reactions prevents further expansion of the carbon dioxide gas from breaking open the can. The internal pressure also prevents further expansion of carbon dioxide gas bubbles within the dough and thus stops the leavening reaction. In chemically leavened refrigerated dough products, leavening agents such as leavening acids and sodium bicarbonate are in direct contact with each other. Small bubbles of carbon dioxide are formed and released during their manufacture and storage. If these doughs are packaged in containers which are not subject to pressurization, complete release of carbon dioxide within the dough occurs and the container may literally explode. Moreover, if the carbon dioxide is liberated from the container during storage, destroying equilibrium within the container, product quality suffers.

The pH of the stored dough is elevated to a range between 6.5–7.5 because of the partial completion of the leavening reaction. This near neutral pH is ideal for microbial growth. Therefore, the microbial safety of the products depends upon a strict control of water activity of the product and maintenance of the anaerobic atmosphere within the can.

In order to reduce the risk of elevated batter pH during storage, actions have been taken to separate batter fractions and to sterilize dough ingredients. The Moran et al. U.S. Pat. No. 3,970,763 issuing Jul. 20, 1976, describes a cake batter which is prepared by mixing separate aqueous and fat phases. Each of the phases has been heat treated. The aqueous phase is aerated prior to heat treatment. The batter is packaged and stored at refrigerated temperatures.

The Keller et al. U.S. Pat. No. 2,870,026 issuing Jan. 20, 1959, describes a refrigerated batter product. The method includes a step of heating a prepared batter at a temperature within a range of 62.8° to 85° C. for about 10 seconds to 30 minutes. The batter is then cooled to a refrigerated temperature. The cooled batter is whipped in order to incorporate gas bubbles within the batter.

One approach to controlling and slowing the leavening reaction is an orchestrated exposure of ingredients to each other. U.S. Pat. No. 2,982,662 issuing May 2, 1961, the Cochran et al. patent, describes a procedure for preventing collapse of water and fat emulsion of a batter during storage. The method includes a step of preparing a batter that includes dicalcium phosphate dihydrate as a sole acidic leavening agent. Any emulsifier such as a lower hydroxy carboxylic acid fatty acid ester of an edible polyhydric alcohol having 3–6 hydroxyl groups is also added as an emulsifier. All ingredients of the batter are mixed together to form a mixture which is homogenized and stored at a refrigeration temperature for a period of about three days. Soda may then be added for leavening. The batter is then stored at refrigeration temperatures until it is used to bake a product.

The Savre et al. U.S. Pat. No. 3,433,646 issuing Mar. 18, 1969, describes a method for making a batter for storage at refrigeration temperatures. The method includes a step of forming an aqueous solution that contains chemical leavening agents and part of the total water content of the batter. The solution is mixed so that the leavening agents react with each other and liberate a portion of the available carbon dioxide. The non-liquid batter forming ingredients are added to the aqueous solution to form a mixture which is blended with the remaining water and mixed to form a homogeneous batter. Residual leavening ingredients in the batter do not react with each other until a temperature of about 60° C. is reached.

One other approach to controlling the leavening reaction during storage is to shield leavening reactants from each other. The Hans U.S. Pat. No. 3,620,763, issuing Nov. 16, 1971, describes a batter that is stored in a pressurized container. The batter includes a polysaccharide hydrophilic film-forming agent. This material acts as a humectant.

The Fehr Jr. et al. U.S. Pat. No. 3,649,304 issuing Mar. 14, 1972, describes a refrigerated batter. The refrigerated batter is made by congealing an acid-leavening agent in a water-gelatin solution. A basic leavener is added to the remaining batter mixture and carbon dioxide is evolved. The congealed acid leavener is added to the batter that includes the basic leavener. Both leaveners react to produce carbon dioxide which displaces oxygen in the container. The container is then subjected to a temperature which is a refrigeration temperature.

Currently, encapsulated sodium bicarbonate is being used in the manufacture of refrigerated doughs. However, the capsules formed with the sodium bicarbonate core function more as processing aids to prevent release of carbon dioxide during the manufacturing process than as a leavening agent. Current levels of encapsulation and quality of capsules and microcapsules provide some degree of shielding and may prevent chemical reaction with leavening acids for a few hours to up to a few days.

The existing capsules do not provide protection through the complete duration of the storage of such products which is around two to three months. Therefore, the cans need to be pressurized to provide adequate shelf life and final finished product quality.

The Selenke U.S. Pat. No. 4,022,917 issuing May 10, 1977, describes a batter that is made with particles of an alkaline leavening agent. These particles are encapsulated in a water-insoluble coating which is added to the batter. The alkaline leavening agent is dispersed in the batter at a cooking temperature and is released at a temperature of at least about 60° C.

PCT Application PCT/US98/15075, which published Feb. 4, 1999, describes a spoonable batter that is stable at refrigeration temperature for at least about 75 days. The batter has a water activity of about 0.81 to 0.92. The batter contains 20 to 30 percent sugar.

Another problem that must be solved in order to make a satisfactory dough or batter product is maintenance of integrity of the dough or batter structure during and after proofing and baked product structure. The Fioriti et al. U.S. Pat. No. 3,975,550 issuing Aug. 17, 1976, describes a batter which is deformable at a temperature as low as −17.8° C. The batter includes ingredients such as eggs, oil, sugar, flour, a leavening agent and a low molecular weight alcohol, glycol or polyol having a freezing point below −17.8° C.

The Aliberto et al. U.S. Pat. No. 4,504,510 issuing Mar. 12, 1985, describes a pancake batter that can be stored in either the refrigerator or a freezer. The pancake batter includes an emulsified plastic shortening capable of forming stabilized air cells. Emulsifiers include mono- and diglycerides and propylene glycol esters of fats and fatty acids. The pancake batter is mechanically aerated and as a consequence of the emulsified plastic shortening presence, air cells formed during aeration remain in the batter over extended periods of time.

The Petrizzelli U.S. Pat. No. 4,904,493, and the Seewi et al. U.S. Pat. No. 5,178,893, describe doughs that can be stored. The doughs have a water content that is not more than 16 percent. The doughs are also made with flour that has been inactivated with respect to enzyme activity.

A European Patent Application, EP 0 868 850 A1, describes shelf-stable cake dough. The dough includes glycerol and a high concentration of sugar in order to reduce water activity. The dough also includes a flour treated to inactivate enzyme activity and an encapsulated leavening system.

SUMMARY OF THE INVENTION

Figure 1:
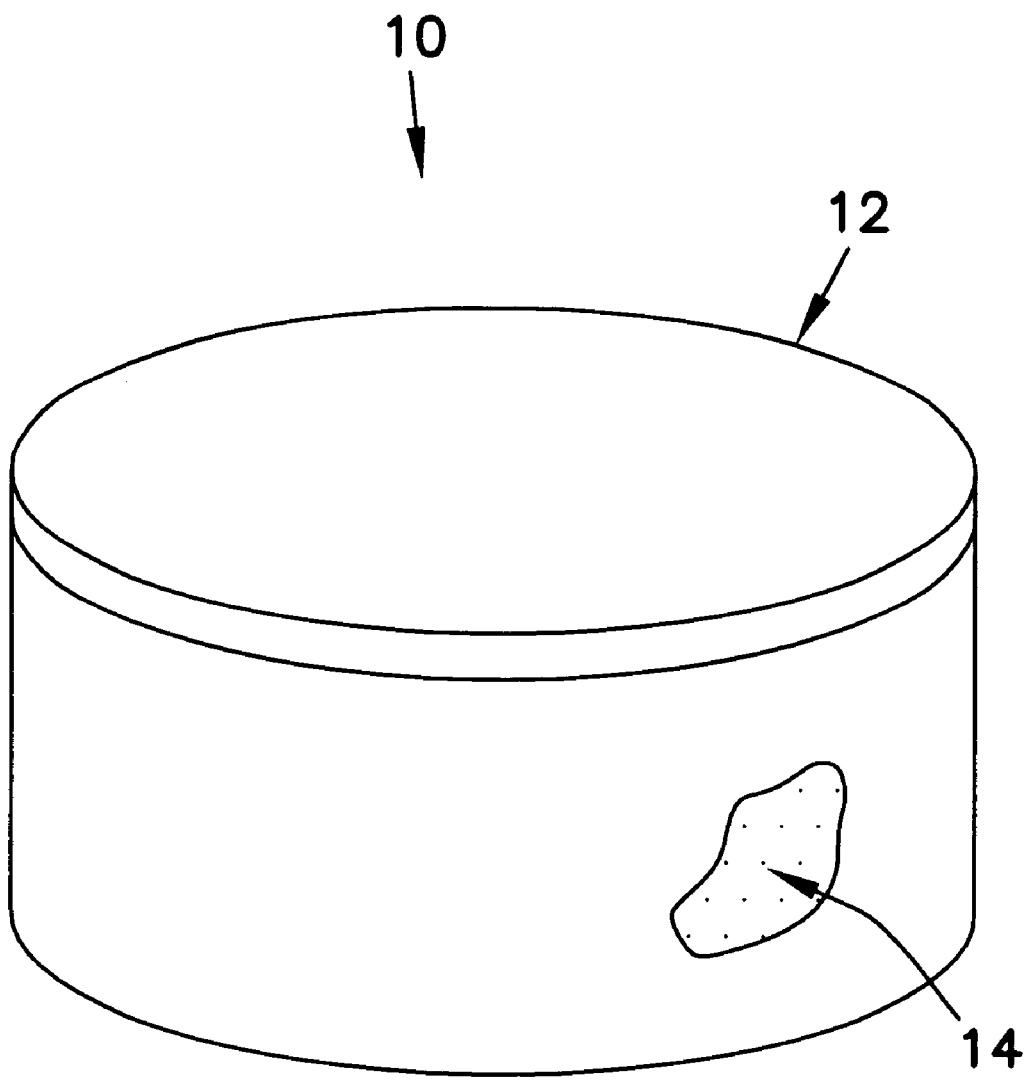
FIG. 1 illustrates a perspective view of one embodiment of a container and the batter, dough or dry mix of the present invention, wherein the batter, dough or dry mix is within the container.

In its product aspect, the present invention resides in a farinaceous, leavened batter or dough that comprises a plurality of capsules and a cookable fluid in which the capsules are dispersed. The capsules are comprised of a shell comprising a lipid that melts at a preselected temperature. In one embodiment, the capsules are comprised of a lipid in a beta or beta prime polymorphic form and a core comprised of a leavening agent. The leavening agent is either a chemical leavening agent or a yeast-based leavening agent or a combination of a chemical leavening and yeast-based leavening agents. The cookable fluid maintains a pH within a range of 3.8 to 6.3 over a storage interval of at least about eight weeks of refrigerated storage. The cookable fluid has a water activity effective for minimizing microbial growth.

Another product embodiment of the present invention also includes a batter or dough that comprises a cookable fluid that has an acidic pH range of 3.8 to 6.3 over a storage interval of at least about eight weeks. The batter or dough also includes at least one preservative effective at the acidic pH that is dispersed in the cookable fluid and water at a concentration effective to impart a water activity to the cookable fluid effective to retard microbial growth.

In its article aspect, the present invention includes articles that comprise a batter, dough or dry mix. The articles include a plurality of capsules and a substantially unpressurized container for containing the batter or dough or dry mix. The batter, dough, or dry mix is storable in the substantially unpressurized container for an extended period of time at refrigeration temperatures.

In its method aspect, the present invention includes methods for preparing a dough, a frozen or refrigerated batter or dry mix that is storable without substantial pressurization. The methods include providing capsules that each comprise a shell made of a lipid that melts at a preselected temperature. In one embodiment, the lipid is in a beta form or a beta prime form and a core comprised of a leavening agent. The methods also include providing a cookable fluid that has a pH effective for minimizing microbial activity. The capsules are added to the cookable fluid to form a dough, batter or dry mix. The dough, batter or dry mix is positioned in a container that is not subject to substantial pressurization and is stored.

One method embodiment of the present invention additionally includes making a yeast leavened bread from stored dough. The method includes providing a plurality of capsules that each comprise a core that includes viable yeast and a shell that melts at a preselected temperature within a range of about 350 to 54.4° C. The method also includes providing a cookable fluid and adding the capsules to the cookable fluid to form a storable dough. The storable dough is added to a container that is not substantially pressurized and stored at a refrigeration temperature. The dough is proofed at a temperature within a range of 35° to 54.4° C. and baked to make a leavened bread.

A further method embodiment of the present invention includes a method for making pancakes from stored batter. The method comprises providing a plurality of capsules that each comprise a core that includes sodium bicarbonate and a shell that melts at a preselected temperature of about 350 to 43.3° C. The method also includes providing a cookable fluid and adding the capsules to the cookable fluid to form a pancake batter. The batter is stored in a container that is substantially free of pressurization at a refrigeration temperature. The batter is cooked to make a pancake.

One other method embodiment of the present invention further includes preserving a batter, dough or dry mix in a flowable condition during storage. The method comprises preparing a batter or dough that has an acidic pH within a range of 3.8–6.3 and a water activity that is maintained within a range effective to retard microbial growth. The method also comprises adding a preservative to the batter or dough that is effective at the acidic pH.

DETAILED DESCRIPTION OF PREFERRED EMBODIMENTS

One embodiment of the present invention includes a leavened batter or dough which is stable at storage temperatures that include refrigeration temperatures, without being substantially pressurized, for extended periods of time. The batter or dough has a pH during storage within a range of about 3.8 to 6.3 for a time period of at least about eight weeks. Values of pH within this range are effective for minimizing microbial growth and for maintaining physical and chemical integrity of the dough or batter during storage. Integrity of the batter or dough is ascertained by measuring the pH. If the pH of the batter falls outside of the range of 3.8 to 6.3, the integrity of the batter or dough is compromised.

The batter or dough has a water activity within a range of about 0.85 to 0.95. The batter or dough comprises particles of a leavening agent which are encapsulated in a composition that melts within a predictable and narrow temperature range. The encapsulating composition in one embodiment comprises fat in a beta or beta prime form, referred to herein as the "encapsulate material" or "shell material." One other embodiment of the present invention includes a method for storing substantially unpressurized batter or dough or dry mix for extended periods of time at storage temperatures that include refrigeration temperatures. The method comprises providing particles of a leavening agent that have been encapsulated in a shell that comprises a fat in the beta or beta prime polymeric state. The leavening agent may be a basic chemical leavening agent such as sodium bicarbonate. The leavening agent may also comprise viable yeast cells. One embodiment of the method also includes preparing a dough or a batter or a dry mix by mixing ingredients that include an acidulant that reduces the pH to a range of 3.8 and 6.3, and a preservative. The particles of leavening agent are added to the batter or dough or dry mix. The dough or batter or dry mix with the particles of leavening agent is stored in a container substantially without pressurization.

One other product embodiment includes a dry mix with capsules dispersed within the dry mix. The dry mix for a baked good such as a cake comprises flour in a concentration of about 35% to 45% by weight of the mixture, sugar in a concentration of about 40% to 54% by weight, shortening in a concentration of about 6% to 16%, leavening capsules in a concentration of about 1% to 5% by weight, and optionally milk solids, egg solids, flavoring, and coloring to form a free-flowing granular mixture.

One additional embodiment of the present invention comprises a plurality of encapsulated particles. Each of the encapsulated particles includes a core that comprises a leavening agent and a shell that comprises a fat in a beta or beta prime form. The leavening agent may be a chemical leavening agent such as sodium bicarbonate or a biological leavening agent such as viable yeast.

"Beta crystals" and "fat in a beta form" as used herein refer to triglyceride crystals having a blocky symmetry, and a length of about 50–100 microns on a side. Beta crystals of triglycerides are aligned in parallel rows. A presence of beta crystals may be determined by a method such as differential scanning calorimetry (DSC) as described in the AOCS Recommended Practice Cj 1-94. The presence may also be determined by x-ray diffraction analysis using a method such as is described in AOCS Cj 2-95 and by low resolution nuclear magnetic resonance using AOCS method Cd 16b-93.

"Beta prime" crystals and "fat in a beta prime form" as used herein refer to triglyceride crystals having a needle shape and a length of about five microns, maximum. Beta prime crystals are arranged in alternate rows at right angles. A presence of beta prime crystals may be determined by a method such as differential scanning calorimetry as described in AOCS Recommended Practice Cj 1-94. The presence may also be determined by x-ray diffraction analysis using a method such as is described in AOCS Cj 2-95 and by low resolution nuclear magnetic resonance using AOCS method 16b-93.

"Capsules" or "encapsulated particles" as used herein refers to particles that have a shell component and a core component comprising a leavening agent wherein the shell component encloses the core component.

"Capsule shell material" or "shell" material, as used herein, refers to a mixture of triglycerides with or without any emulsifiers such as is found in hydrogenated vegetable oil, crystallized in the beta form and having a very narrow melting point range of about 40.6 to 48.9° C. for one embodiment and about 35 to 43.3° C. for another embodiment. The capsule material is made under pressure, in accordance with a method such as is described in U.S. Pat. No. 5,209,879 issuing May 11, 1993, which is herein incorporated by reference.

"Refrigeration temperature" as used herein refers to a temperature within a range of about 3° to 8° Centigrade.

"Extended periods of time" as used herein refers to a storage period of up to about six to eight weeks or more.

"Effective pH" as used herein refers to a range of pH for a dough or batter that inhibits undesirable microbial growth but does not significantly impact physical or chemical integrity of batter or dough.

"Dough" as used herein refers to an intermediate food product that has a low water concentration. Dough includes gluten, which forms in a continuous dough medium into which other ingredients are embedded. A dough is typically prepared by beating, blending, cutting or kneading and is often stiff enough to cut into various shapes. A dough may be baked to make a chemically leavened product such as a quick bread or a yeast leavened product.

"Batter" as used herein refers to an intermediate food product that essentially contains flour, water and salt and optionally fat and sugar(s). Gluten development in a batter is minimized. Liquid added to make the batter forms a continuous batter medium in which other ingredients are dispersed. A batter cooks into a soft, moist and sometimes crumbly product. A batter is typically prepared by blending, creaming, stirring or whipping and is generally thin enough to pour.

"Dry mix" as used herein refers to a particulate composition that is convertible to a batter with an addition of water or other high moisture ingredients such as milk, beer and/or eggs.

"Cookable fluid" as used herein refers to batter or dough.

The batter or dough of the present invention has attributes that have heretofore been unavailable in leavened batters or doughs used to make such products as muffins, pancakes, biscuits and cakes or yeast leavened bread. Previous efforts to store chemically leavened batter using a capsule-based technology, have relied upon a presumption that the leavening agents must be activated at a temperature of about 60° C. It was believed that a barrier, such as an encapsulated material, separating a leavening agent from the batter or dough that melted at a lower temperature, would have a tendency to melt or disperse during storage. Leavening agents encapsulated at this lower temperature were also susceptible to premature exposure to the dough or batter media due to melting of the shell during pasteurization used to kill and control microorganisms in the batter or dough. Leavening agents were also susceptible to premature exposure to batter or dough because the capsule material was applied unevenly over the particle or cracked after application.

What has been observed, however, is that a capsule shell melting temperature of 60° C. produces a baked product which does not display optimal air cell integrity and does not have optimal organoleptic properties. Capsule shell material does not melt uniformly from particle to particle. Pockets of unmelted capsules create an undesirable condition of over-leavening and under-leavening in a baked product. Furthermore, because the shell material melting point is 60° C., the structure of a baked product begins to set even before the leavening reaction is complete which imparts to the baked product, an unacceptable texture.

What has been found in the present invention is that reducing the melting point of capsule shell material to a temperature below 51.7° C. for baked and fried products such as muffins, biscuits, cakes, pancakes or waffles and controlling the shell melting point within a very narrow range produces a baked product having a superior and uniform air cell size and distribution even after long term storage of the batter or dough. The batter or dough of the present invention produces a baked good having excellent organoleptic properties.

The lower temperature capsule shell material is used because of the very narrow melting point range of the material and because the batter or dough of the present invention is not subject to heat pasteurization. The batter or dough of the present invention does not require heat pasteurization because a combination of factors are used to preserve the batter. The batter or dough is maintained in a pH range of about 3.8 to 6.3 and a water activity range of about 0.85 to 0.95 during storage. In combination, these variables are effective in substantially retarding the growth of any undesirable micro-organisms. The batter or dough of the present invention can additionally include a supplemental preservative such as potassium sorbate or calcium propionate to limit or to assist in limiting microbial growth.

A combination of different preservation techniques such as maintaining pH of batter between about 3.8 and 6.3, maintaining temperature of the batter during storage at or near refrigeration temperature, maintaining water activity within a range effective to retard microbial growth and adding preservatives have been used in the present invention to preserve the batter or dough for at least about eight weeks.

All of these different preservation techniques are not sufficient to get shelf life greater than eight weeks if used alone. For example, lowering the storage temperature in itself would not extend shelf life. If the storage temperature is decreased to 4.4° C. from 21.1° C., psychrophilic bacteria can still grow. At pH values below 6, spore formers and pathogens may grow. At pH values below 4.6, yeast, mold and some bacteria can grow. Preservatives such as sorbates and propionates or parabens are effective at slightly acidic pH values against yeast and mold but are not completely effective against bacteria. Organisms such as Staphylococcus, yeast and mold can grow in a medium with a water activity as low as 0.85. By using a combination of an acidic pH, a reduced, constant temperature of storage, and water activity, good synergy is obtained to achieve the required shelf-life. The preservatives are only added for extra assurance.

The percent of chemical leavening agent, used to make the batter or dough, that is encapsulated depends upon the type of batter or dough made. For instance, a baking powder capsule cover has as constituents, about 30–40 percent by weight sodium bicarbonate as well as monocalcium phosphate (MCP), monocalcium phosphate anhydrous (AMCP), sodium acid pyrophosphate (SAPP), sodium aluminum phosphate (SALP), dimagnesium phosphate (DMP), fumaric acid, adipic acid and sodium aluminum sulphate (SAS). The sodium bicarbonate material is a core constituent of the capsule.

Reaction between a basic leavening agent such as sodium bicarbonate and acidic leavening agents such as monocalcium phosphate, sodium aluminum phosphate, and sodium pyrophosphate results in the production of carbon dioxide. The liberation of carbon dioxide at the right time during the baking cycle is critical to the development of structure and texture of the baked product. In a batter, typically both the acid and base components of leavening are in contact with each other. This contact results in a premature reaction between acids and bases to release carbon dioxide which drastically affects product quality when the batter is baked after a period of time in storage.

This contact is prevented from occurring prematurely in the present invention by encapsulating the sodium bicarbonate with a shell material that uniformly coats the sodium bicarbonate and that is resistant to fissure formation. Encapsulating sodium bicarbonate not only prevents a premature reaction releasing carbon dioxide but leaves the acidic leavening agents in the batter which helps to reduce the pH of the batter which, as discussed, is critical in its preservation.

In one preferred embodiment, the capsules are manufactured by Verion, Inc. of Exton, Pa. The capsules have a core content in a range of 10 to 70% by weight. Each of the capsules comprises a shell and active core ingredients sealed within the shell. The shell comprises about 30 to 90% by weight of the total encapsulated particle. The shell of the capsule of the present invention is of a substantially uniform thickness, forms a continuous coating on the sodium bicarbonate particle and is substantially free from cracks or fissures.

The presence of cracks or fissures may result in the diffusion of water through these cracks allowing soda and acid to come in contact. The cracks may widen because of temperature fluctuations or pressure created by carbon dioxide due to reaction between sodium bicarbonate and acid.

Substantially one hundred percent of the encapsulated particle population passes through a 60-mesh screen. An average particle size of the encapsulated sodium bicarbonate material is within a range of 100 to 250 microns. The sodium bicarbonate core of the encapsulated leavening agent has a particle size of 60 to 100 microns.

A useful herein shell composition that melts at about 35 to 51.7° C. includes ingredients of a triglyceride glyceryl tristearate component of hydrogenated vegetable oil converted to a triclinic crystal lattice structure, which is in the beta form, by a process that is described in U.S. Pat. No. 5,209,879, issuing May 11, 1993. This process includes providing a polymorphic fat and melting the fat. The melted fat is confined in a chamber and subjected to the action of at least one stroke of a piston. The fat is then allowed to solidify. It has been found that this shell melting temperature is preferred for products such as muffins, cakes, brownies, pancakes, biscuits, cookies and so on. The temperatures of these batters do not exceed 98.9° C., although they are baked in an oven at a temperature of 176.7 to 218.3° C.

Use of a shell material with a melting point that is greater than 54.4° C. results in an incomplete, nonuniform leavening reaction in the baked product resulting in specks or spots of sodium bicarbonate. Moreover, with the higher melting point of the shell material, the leavening reaction occurs late in the baking cycle at a time when the structure of the product begins to set when the leavening reaction has just begun. Ideally, the structure should start setting once the leavening reaction is almost complete.

A shell composition that melts in a range of about 35 to 51.7° C. includes ingredients of a hydrogenated vegetable oil subjected to the high pressure process described in U.S. Pat. No. 5,209,879, which issued May 11, 1993. This shell, melting at a lower temperature, is used in baked products, pancakes, and in yeast leavened dough.

One other benefit of the encapsulate material used to make the batter of the present invention is that the lipid material of the shell, is changed from the crystalline form of the fat into the beta or beta prime form. It is believed that the beta or beta prime form is a more stable form with respect to changes in temperature. This stability results in the shell having a narrow melting point range and good, stable shell coating properties.

The salt concentration ranges from about 0.5 to 2% by weight of the batter. The sugar concentration is dependent upon the type of product and can range from 1 to 35% by weight. For some batters, a cocoa ingredient is added. This ingredient may be added up to a concentration of 10%, by weight. The batter may optionally contain edible fatty triglycerides of to a concentration of 15% by weight. It is not required, however, that the batter contain fatty triglycerides. The batter includes a water content within a range of 30 to 50% by weight. The batter further includes an acidulant to impart a pH to the batter ranging from about 4.5 to 6.3.

A beta lipid shell material that encapsulates a sodium bicarbonate leavening agent has a melting point within a range of about 35 to 51.7° C. What this means is that different types of capsule shell materials may be employed to make particles having a melting point of 35 to 51.7° C. as compared to the capsule material making particles melting at about 43.3° C. Encapsulating shell materials that melt at a temperature below about 51.7° C. makes capsules that are suitable for use in making a fried batter, such as pancake batter.

A lower melting point is required for a batter such as pancake batter because this batter is not baked in an oven at a temperature of about 176.7° C. Rather, this type of batter is fried on a griddle for a much shorter period of time, at a much higher temperature. Because of the very short cooking time and an instantaneous exposure to high temperature, the encapsulating shell layer must be capable of melting at substantially the same time that the batter is applied to a griddle in order for the leavening agent to act before the pancake structure is set.

To better illustrate the advantages and product characteristics of the capsules, doughs, batters and dry mixes of the present invention, specific examples of various formulations are set out below in detail.

EXAMPLE 1

A bread mix may be prepared having the following formulation:

| Ingredients | Weight % |
| --- | --- |
| Wheat flour* | 41.5 |
| Yeast | 2.0 |
| Non-fat dry milk | 0.8 |
| Sucrose | 2.5 |
| Salt | 0.8 |
| Chemical leavening | 4 |
| Dough conditioner | 0.25 |
| Minor Ingredients | 0.6 |
| Gum | 0.4 |
| Water | 47 |

EXAMPLE 2

A batter for a cake having the following formulation may be prepared as follows:

| Ingredient | Weight % |
| --- | --- |
| Sucrose | 19.0 |
| Flour | 25.0 |
| Fat | 10.0 |
| Whole eggs | 15 |
| Leavening | 1.5 |
| Salt | 0.4 |
| Starch | 1.0 |
| Gums/Emulsifiers | 0.5 |
| Water | 10.0 |
| Total | 100.0 |

EXAMPLE 3

A chocolate chip cookie dough may be prepared as follows:

| Ingedient | % By Weight |
| --- | --- |
| Flour | 25.0 |
| Chocolate chips | 24.0 |
| Leavening | 0.5 |
| Fat | 15.0 |
| Sugar | 25.0 |
| Whole Egg | 8.0 |

EXAMPLE 4

Pancakes may be prepared with a batter made from the following ingredients:

| Ingredient | % by Weight |
| --- | --- |
| Flour | 27.0 |
| Sugar | 4.5 |
| Other flour | 9.5 |
| Salt | 0.7 |
| Buttermilk powder | 1.0 |
| Fat | 1.8 |
| Egg Powder | 0.7 |
| Water | 53.0 |
| Leavening | 1.85 |

EXAMPLE 5

A biscuit dough was prepared with the following ingredients:

| Ingredient | % by Weight |
| --- | --- |
| Flour | 50.0 |
| Fat | 8.0 |
| Sugar | 2.0 |
| Water | 35.0 |
| Salt | 1.5 |
| Chemical Leavening | 2.2 |
| Buttermilk Powder | 1.3 |

EXAMPLE 6

A muffin batter was prepared with the following ingredients:

| Ingredient | % by Weight |
| --- | --- |
| Flour | 30.0 |
| Sugar | 22.0 |
| Fat | 6.5 |
| Whole Eggs | 6.0 |
| Water | 32.0 |
| Leavening | 2.0 |
| Starch | 1.0 |
| Salt | 0.5 |

Once the batter or dough is prepared, the batter or dough is transferred to a container and is stored. The batter or dough is not stored under substantial pressurization. The batter or dough may be shipped under protected ambient storage. In particular, shipping distribution is performed so that the containers have minimal exposure to temperatures above 26.7° C. Even while distributed under these ambient storage conditions, the final batter product is sold as a refrigerated item.

To prepare the batter or doughs, the dry ingredients, such as wheat flour, sweetening agents, shortening, leavening agents, salt and so on are blended with liquid ingredients such as milk or water, oil, eggs and so on. The encapsulated sodium bicarbonate cover is then added to make the batter. The resulting batter is transferred to a container which is not subject to pressurization and may be stored for at least about 6–8 weeks.

The batter may be packaged in either cardboard cans or plastic jugs or tubs or flexible packaging such as plastic pouches other convenient packaging material such as illustrated in FIG. 1. The batter may be preformed in a baking tray specific to the desired type of final baked product.

The encapsulated shell material that surrounds the bicarbonate of soda is stable for at least about two to three months in a refrigerated batter product or dough product such as is used to make muffins, pancakes, cakes, brownies, biscuits, dinner rolls, sweet rolls, pizza crusts, bread sticks and so on. Thus, it is preferred that the dough or batter be baked or cooked and consumed within this interval.

The pancake batter embodiment may be stored in a traditional gable-top carton with a plastic pour spout. It is desirable for a pancake batter to have a pH which is below 6.0 at refrigeration storage temperature. The pancake batter is prepared in order to provide about 60 days of shelf life at refrigeration temperature without showing significant discoloration and providing sufficient leavening action to produce high quality pancakes when baked on a griddle.

Batters used to make products such as pancakes, muffins, cakes, brownies, biscuits and cookies may be prepared by conventional mixing with or without aseptic techniques. The batters may be prepared without traditional heat pasteurization. Flours used to make batters, such as wheat flour, corn flour and/or soy flour may be subjected to a sterilization procedure such as dry sterilization, infrared heating, microwave heating, or irradiation or any other process suitable for decreasing the microbial load on the dry materials. Sterilized water may be used to prepare the batters. As discussed, the encapsulated sodium bicarbonate melts at a temperature below 49° C. and in one embodiment, melts at about 38° C.

In one other embodiment of the dough of the present invention, capsules that encapsulate active or viable yeast cells are employed. The shell material that encapsulates the yeast cells is a hydrogenated vegetable oil transformed to the beta polymorphic form, and having a melting point within a range of about 32 to 38° C. Within this temperature range, yeast cells are released into the dough and leaven the dough. The yeast encapsulated with a capsule cover may be an active dry yeast. An optimal temperature for growth of an active dry yeast is a range of about 40 to 46° C. The yeast capsule cover may be a quick rise dry yeast. An optimal temperature for growth of the quick rise dry yeast is about 51 to 55° C. Because of this temperature range, the quick rise dry yeast may be encapsulated with a shell material having a higher melting temperature, such as 43° C.

The yeast leavened dough of the present invention is made by combining and mixing dough ingredients such as flour, water, salt and a preservative such as potassium sorbate or calcium propionate or paraben. The dough is kneaded until it is smooth and elastic. Encapsulated yeast particles are added to the kneaded dough. The dough is stored in an unpressurized container at a refrigeration temperature. The container may have a symmetry ranging from rectangular to make a loaf of bread or square or round or oval or other symmetry to impart a particular shape to the baked product.

Prior to baking the dough, the dough is placed in a warm place, such as an oven, at a temperature of about 35° to 54.4° C. The dough may be transferred to another container or may be proofed and baked in the storage container. The temperature is of a magnitude to melt the shell material of the yeast capsule and to initiate fermentation and proofing of the dough. When the dough volume has approximately doubled, the dough is subjected to a temperature of about 176° C. until baked.

It is to be appreciated that the batters and doughs of the present invention have been described in particular detail with respect to preferred processes and structures. The preferred compositions of the batters and doughs are ideally suited for the described processes. The present invention, however, is not intended to be limited to these preferred batter and dough compositions. One skilled in the art will readily recognize that the actual composition of the batters and doughs may be adjusted to accommodate particular process conditions. The scope of the batter and dough of the present invention is intended to be defined by the claims which follow.

What is claimed is:

1. A batter or dough, comprising:
   a plurality of capsules, each capsule comprising a shell comprised of a lipid melting at a preselected temperature between 35° C.–51.7° C. and a core comprised of a leavening agent; and
   a cookable fluid wherein the plurality of capsules are dispersed within the fluid, the cookable fluid having a pH of 3.8 to 6.3.

2. The batter or dough of claim 1 wherein each of the capsules is of a size that falls within a range of 100 to 250 microns.

3. The batter or dough of claim 1 wherein each of the capsule shells melts at a temperature of about 35 to 49 degrees Centigrade.

4. The batter or dough of claim 1 wherein each of the capsule shells melts at a temperature of about 38 degrees Centigrade.

5. The batter or dough of claim 1 wherein the lipid is in a beta form or a beta prime form.

6. The batter or dough of claim 1 wherein the cookable fluid has a water activity effective for reducing growth of microbiological organisms.

7. The batter or dough of claim 1 wherein the core leavening agent comprises sodium bicarbonate.

8. The batter or dough of claim 1 wherein the cookable fluid comprises an acidic leavening agent.

9. The batter or dough of claim 8 wherein the acidic leavening agent comprises one or more of monocalcium phosphate, sodium aluminum phosphate and sodium pyrophosphate.

10. The batter or dough of claim 1 wherein each of the capsule shells comprises a hydrogenated vegetable oil.

11. The batter or dough of claim 1 wherein the cookable fluid has a water activity that is less than 0.94.

12. The batter or dough of claim 1 wherein the cookable fluid has a water concentration of about 20 to 50 percent by weight.

13. The batter or dough of claim 1 wherein the core leavening agent comprises viable yeast cells.

14. An article comprising:
    a batter or dough comprising a plurality of capsules that each comprise a shell comprised of a lipid that melts at a preselected temperature between 35° C.–51.7° C. and a core comprised of a leavening agent and a cookable fluid wherein each of the capsules is dispersed within the fluid; and
    an unpressurizable container for containing and storing the batter.

15. The article of claim 14 wherein the cookable fluid of the batter has a pH of about 3.8 to 6.3.

16. The article of claim 14 wherein the core leavening agent comprises sodium bicarbonate.

17. The article of claim 14 wherein the cookable fluid comprises an acidulant.

18. The article of claim 17 wherein the acidulant is an acidic leavening agent.

19. The article of claim 14 wherein the core leavening agent is one or more yeast cells.

20. The article of claim 14 wherein the unpressurized container is a baking container.

21. The article of claim 20 wherein the container has a shape which is imparted to the cookable fluid during baking.

22. The article of claim 20 wherein the lipid of the shell is comprised of a beta crystal form or a beta prime crystal form.

23. A method for preparing a dough or batter that is storable without pressurization, comprising:
    providing a plurality of capsules that each comprise a shell made of a lipid melting at a preselected temperature between 35° C.–51.7° C. and a core comprised of a leavening agent;
    providing a cookable fluid that has a pH within a range effective for minimizing microbial activity; and
    adding the plurality of capsules to the cookable fluid to form the dough or batter.

24. The method of claim 23 and further including adding an acidulant to the cookable fluid to adjust pH to 3.8 to 6.3.

25. The method of claim 23 and further including adding an acidic leavening agent to the cookable fluid.

26. The method of claim 23 and further including transferring the dough or batter to a storage container.

27. The method of claim 23 and further including storing the dough or batter at a refrigeration temperature without pressurization.

28. A capsule comprising a core that comprises a leavening agent and a shell that comprises a lipid in a beta form or a beta prime form.

29. The capsule of claim 28 wherein the leavening agent comprises yeast.

30. The capsule of claim 28 wherein the leavening agent comprises sodium bicarbonate.

31. The capsule of claim 28 wherein the shell has a melting point of about 35 to 55 degrees Centigrade.

32. The capsule of claim 28 wherein the shell has a melting point of 43 degrees Centigrade.

33. A method for making a yeast leavened bread from stored dough, comprising:
    providing a plurality of capsules that each comprise a core that comprises yeast and a shell that melts at a temperature within a range of about 40 to 55 degrees Centigrade;
    providing a cookable fluid;
    adding the capsules to the cookable fluid to form a storable dough;
    adding the storable dough to a container which is not pressurized;
    storing the dough at a refrigeration temperature;

proofing the dough at a temperature within a range of about 40 to 55 degrees C; and baking the dough to make a leavened bread.

34. The method of claim 33 wherein the yeast cells encapsulated are active dry yeast cells.

35. The method of claim 33 wherein the yeast cells encapsulated are quick rise dry yeast cells.

36. A method for making pancakes from stored batter, comprising:

providing a plurality of capsules that each comprise a core comprising sodium bicarbonate and a shell that melts at a temperature of about 35 to 44 degrees C;

providing a cookable fluid;

adding the capsules to the cookable fluid to form a pancake batter;

storing the batter in a container that is free of pressurization at a refrigeration temperature; and cooking the batter to make a pancake.

37. A method for preserving a batter or dough in a flowable condition during storage, comprising:

preparing a batter or dough that has an acidic pH and a water activity;

maintaining the water activity within a range effective to retard microbial growth;

adding preservatives to the batter or dough effective at an acidic pH; and adding a plurality of capsules, each capsule comprising a shell comprised of a lipid melting at a preselected temperature between 35° C.–51.7° C. and a core comprised of a leavening agent.

38. The method of claim 37 wherein the pH is about 3.8 to 6.3.

39. The method of claim 37 wherein the water activity is 0.85 to 0.95.

40. The method of claim 37 and further including storing the batter or dough at refrigeration temperatures.

41. The method of claim 37 wherein the preservatives comprise potassium sorbate or calcium propionate or parabens.

42. A batter or dough, comprising:

a cookable fluid that has an acidic pH;

at least one preservative effective at an acidic pH that is dispersed in the cookable fluid;

water at a concentration effective to impart a water activity to the cookable fluid effective to retard microbial growth; and a plurality of capsules, each capsule comprising a shell comprised of a lipid melting at a preselected temperature between 35° C.–51.7° C. and a core comprised of a leavening agent.

43. The batter or dough of claim 42 wherein the pH is about 3.8 to 6.3.

44. The batter or dough of claim 42 wherein the preservative comprises potassium sorbate or calcium propionate or parabens.

45. The batter or dough of claim 42 wherein the water activity is about 0.85 to 0.95.

46. A method for testing integrity of batter or dough in storage, comprising:

providing a batter or dough;

storing the batter or dough at a refrigeration temperature;

measuring pH of the batter or dough; and discarding the batter or dough if the pH is outside of a range of 3.8 to 6.3.

47. A dry mix, comprising:

a plurality of capsules, each capsule comprising a shell comprised of a lipid melting at a preselected temperature below a cooking temperature and a core comprised of a leavening agent; and one or more of flour, sugar, shortening, salt, milk solids, egg solids, flavoring, and coloring.

48. The dry mix of claim 47 and further comprising a preservative to retard microbial growth.

49. The dry mix of claim 47 and further comprising an enclosure for enclosing the dry mix.

* * * * *